United States Patent [19]

Pauwels

[11] 4,310,201
[45] Jan. 12, 1982

[54] ADAPTIVE TRACTION PRESSURE REGULATOR

[75] Inventor: Edward M. Pauwels, South Bend, Ind.

[73] Assignee: The Bendix Corporation, Southfield, Mich.

[21] Appl. No.: 101,301

[22] Filed: Dec. 7, 1979

[51] Int. Cl.³ .............................................. B60T 8/02
[52] U.S. Cl. .................................... 303/110; 137/85; 180/197; 303/116; 303/119
[58] Field of Search ............... 303/116, 115, 114, 117, 303/118, 119, 100, 110; 180/197, 76; 137/85; 188/181 A

[56] References Cited

U.S. PATENT DOCUMENTS 2,825,354  3/1958  DuBois ................................ 137/85
4,206,950  6/1980  Elliott ............................ 303/119 X Primary Examiner—Douglas C. Butler
Attorney, Agent, or Firm—Paul David Schoenle; Ken C. Decker

[57] ABSTRACT

A pressure regulator for an anti-skid/anti-spin brake system includes a regulator which adjusts an accumulator pressure to the brake fluid pressure generated during an operator brake application. The adjusted pressure may then be communicated to a wheel brake by a modulator valve during the final phase of an anti-skid cycle. In the absence of an operator brake application a spring biases the regulator so that a reduced accumulator pressure is available for communication to the brake during anti-spin operation. A piston responds to brake pressure generated during an operator brake application to prevent the spring from influencing the adjusted accumulator pressure.

6 Claims, 2 Drawing Figures

ADAPTIVE TRACTION PRESSURE REGULATOR

BACKGROUND OF THE INVENTION

It is known that potential skidding or spinning wheel conditions in a vehicle can be compensated for by respectively relieving or intensifying the brake fluid pressure communicated to the brake associated with the particular skidding or spinning wheel. The electrical circuitry for detecting potential skidding and/or spinning wheel conditions is well known as evidenced by U.S. Pat. Nos. 3,487,887, and 3,811,526. Generally, a closed center anti-skid/anti-spin brake system, such as is disclosed in U.S. application Ser. No. 897,240, filed Apr. 17, 1978 now U.S. Pat. No. 4,206,950, includes an electronic control unit which actuates modulator valves to control the communication of fluid pressure to the wheel brakes. For example, during antiskid operation when a skidding condition is imminent, the control unit causes the modulator valve to close communication between the operator controlled brake pressure source and the brake. Then, when the potential skid condition has been eliminated, even if only momentarily, the control unit causes the modulator valve to open communication between an accumulator and the brake, to thereby repressurize the brake. During anti-spin operation the control unit causes the modulator valve to communicate the accumulator with the brake to retard the rotation of the wheel in the absence of an operator brake application. However, the fluid pressure in the accumulator is usually too high to be communicated to the brake for acceptable performance during either anti-skid or anti-spin operation.

SUMMARY OF THE INVENTION

An advantage of the present invention is that it provides a regulator which, during the final phase of antiskid operation, communicates the brake with a fliud pressure level which is substantially equal to the fluid pressure level generated in response to an operator brake application.

Another advantage of the present invention is that it provides a regulator which, during anti-spin operation, communicates the brake with a predetermined portion of the accumulator pressure level.

Accordingly, there is herein provided a regulator for an anti-skid/anti-spin brake system which regulates the fluid pressure communicated to the brake during anti-skid operation and during anti-spin operation. The regulator includes a housing which defines an inlet chamber communicating with an accumulator, an outlet chamber communicating with a modulator valve and a control chamber communicating with a source of controlled pressure such as a brake master cylinder. A valve member inside of the regulator housing controls fluid communication between the inlet and outlet chambers thereof. A spring urges the valve member to a closed position. Fluid pressure in the outlet chamber is communicated to opposite ends of the valve member to prevent a pressure lock from holding the valve member in a closed position. A pressure responsive member is responsive to fluid pressure in the outlet and control chambers and controls the position of the valve member to adjust communication between the inlet and outlet chambers so that the fluid pressure in the outlet chamber is substantially equal to the fluid pressure in the control chamber during an operator brake application. A piston under the influence of a spring, engages and moves the pressure responsive member to thereby position the valve member to communicate a predetermined portion of the accumulator pressure from the inlet chamber to the outlet chamber when the pressure in the control chamber is low during the absence of an operator brake application. During a brake application the increased fluid pressure in the control chamber causes the piston to separate and move away from the pressure responsive member so that the valve member position is not influenced by the spring. A relief valve may be provided to communicate the inlet chamber with a fluid reservoir when the accumulator pressure exceeds a predetermined level.

DETAILED DESCRIPTION

Figure 1:
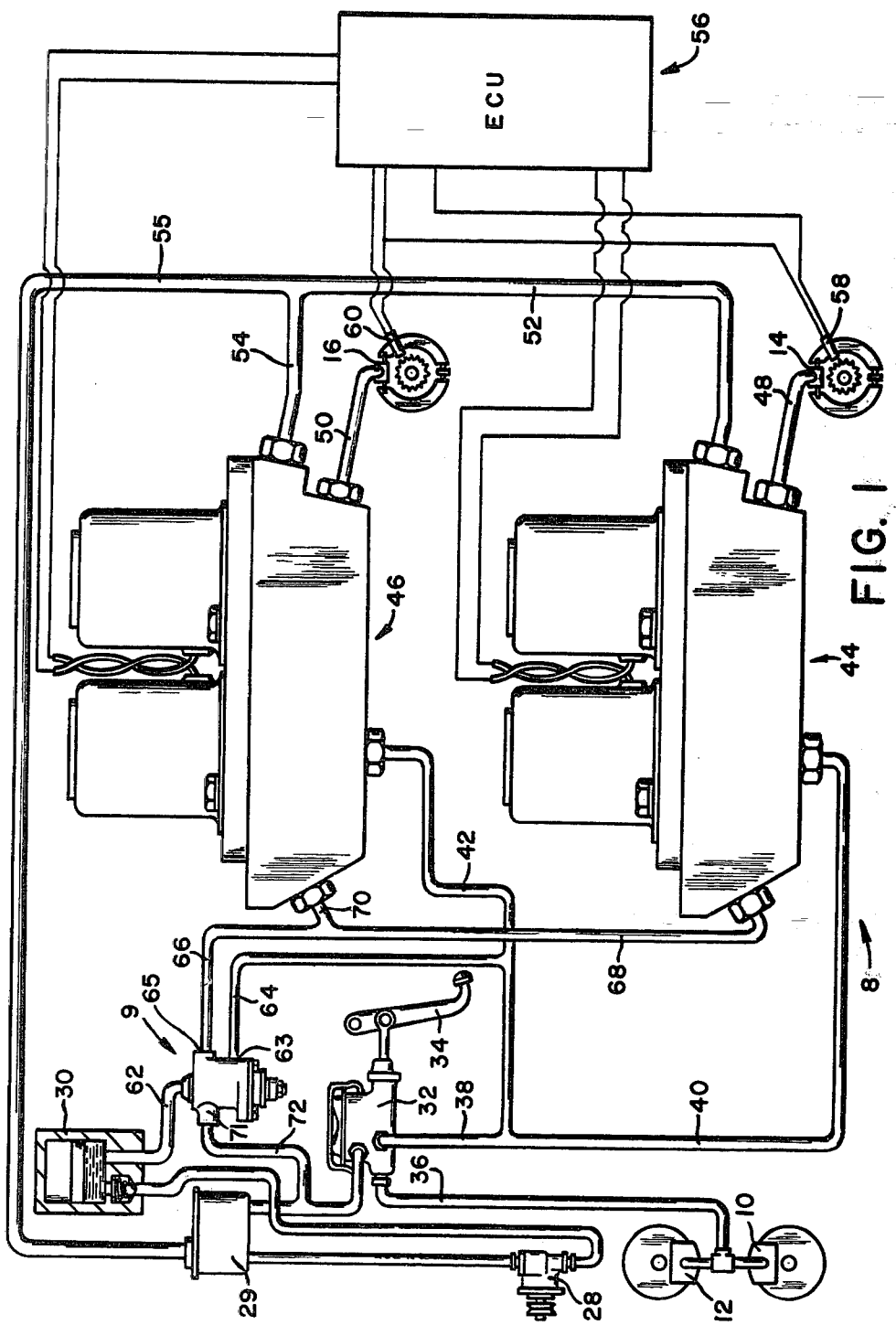
FIG. 1 is a schematic illustration of an adaptive traction braking system haing a pressure regulator made pursuant to the teachings of the present invention.

The brake system 8 includes fluid-actuated brake devices 10 and 12 for braking a pair of non-driven wheels (not shown) and fluid-actuated brake devices 14 and 16 for retarding the rotation of the driven wheels (not shown). A pump 28 transfers brake fluid from reservoir 29 to a fluid pressure storage device such as accumulator 30. Master cylinder 32 receives brake fluid from reservoir 29 and, in response to an operator brake application through movement of pedal 34, communicates pressurized brake fluid to brake devices 10 and 12 through conduits 36. Pressurized brake fluid is communicated to brake devices 14 and 16 from master cylinder 32 via conduits 38, 40, and 42, modulator valves 44 and 46, as disclosed in U. S. Application Ser. No. 897,240, and conduits 48 and 50. Return conduits 52, 54, and 55 communicate brake fluid from modulator valves 44 and 46 back to reservoir 29. The brake system 8 also includes an electronic control unit 56 such as is disclosed in Application Ser. No. 897,240.

Figure 2:
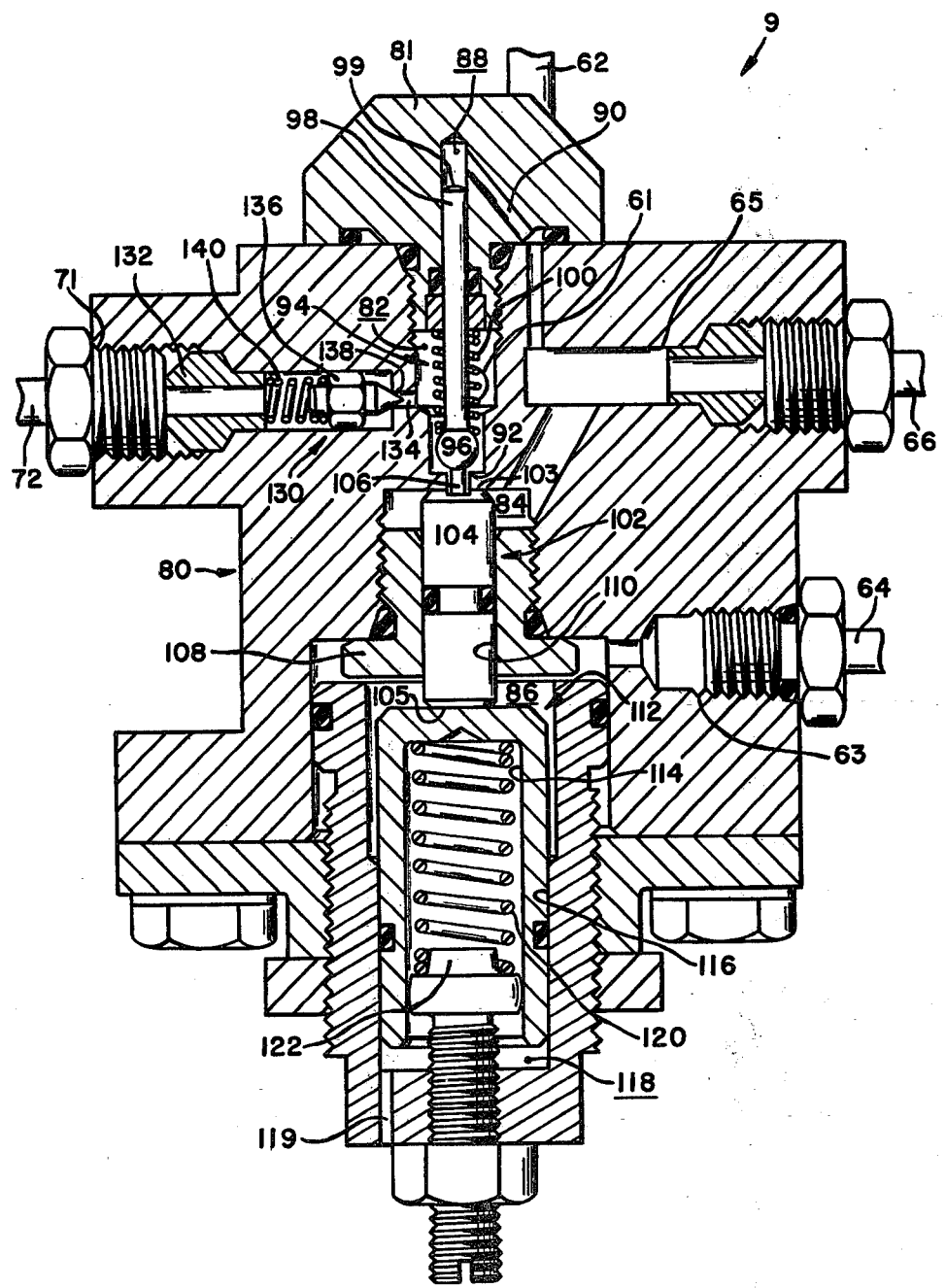
FIG. 2 is a sectional view of applicant's pressure regulator.

Referring to FIG. 2, the regulator 9 includes a housing 80 which defines an inlet chamber 82 which is communicated with accumulator 30 via inlet port 61 and conduit 62. The housing 80 also defines an outlet chamber 84 which is communicated with modulator valves 44 and 46 via outlet port 65 and conduits 66, 68, and 70. Housing 80 also defines a control chamber 86 which is communicated with master cylinder 32 via control port 63 and conduits 64, 42, and 38. Housing 80 includes an end cap portion 81 which encloses a balancing chamber 88. Balancing chamber 88 is communicated with outlet chamber 84 via passage 90 and outlet port 65.

The housing 80 forms a valve seat 92 between the inlet chamber 82 and the outlet chamber 84. Valve member 94 includes a spherical portion 96 and a rod portion 98 extending therefrom. Spherical portion 96 cooperates with the valve seat 92 to control communication of fluid pressure from the inlet chamber 82 to the outlet chamber 84. Spring 100 is biased to urge spherical valve member portion 96 to a closed position relative to valve seat 92. Rod portion 98 includes an end 99 exposed to the fluid pressure in balancing chamber 88. Spherical portion 96 is exposed to the outlet chamber fluid pressure through valve seat 92. The diameter of rod portion 98 is chosen so that the area of end 99 is the same as the effective area of spherical portion 96 which is exposed to the fluid pressure in the outlet chamber 84 when spherical portion 96 is seated against valve seat 92. Thus, since the fluid pressure in balancing chamber 88 is equal to the fluid pressure in outlet chamber 84, a pressure lock, which could otherwise hold valve member 94 in a closed position against valve seat 92, is avoided.

Housing 80 includes a cylindrical fitting 108 with a bore 110 extending therethrough. A pressure responsive member 102 is sealingly and slidably mounted in bore 110 and prevents fluid communication between the outlet chamber 84 and the control chamber 86. Pressure responsive member 102 includes a cylindrical body portion 104 and pin portion 106 projecting axially therefrom. Thus, one end face 103 of pressure responsive member 102 is exposed to fluid pressure in the outlet chamber 84 and the other end face 105 is exposed to fluid pressure in the control chamber 86. Pin portion 106 of member 102 is adapted to engage spherical portion 96 of valve member 94 to control the position of spherical portion 96 relative to valve seat 92.

Regulator 9 also includes a cylindrical piston 112 defining a blind axial bore 114 therein. Piston 112 is slidably and sealingly mounted in a bore 116 defined within housing 80 and piston 112 cooperates with the wall of bore 116 to separate control chamber 86 from an atmospheric pressure chamber 118. Piston 112 is thus exposed on one side to the fluid pressure in control chamber 86 and on the other side to atmospheric pressure in chamber 118 through atmospheric port 119.

Spring 120 engages an abutment member 122 which is threadably fixed to housing 80. Spring 120 urges piston 112 into engagement with pressure responsive member 104 so that member 104 tends to move spherical valve member portion 96 away from valve seat 92 to open communication between inlet chamber 82 and outlet chamber 84. Abutment member 122 is threadably connected to housing 80 so that the force of spring 120 may be adjusted.

Relief valve 130 includes a relief chamber 132 which communicates with the fluid reservoir 29 via port 71 and conduit 72. Orifice 134 communicates inlet chamber 82 with relief chamber 132. A shuttle valve member 136 cooperates with valve seat 138 to control communication between orifice 134 and relief chamber 132. Spring 140 is biased to urge valve member 136 into sealing engagement with valve seat 138 unless the fluid pressure in the inlet chamber exceeds a predetermined level. Alternatively, a relief valve (not shown) may be located in the outlet port 65 with an orifice similar to orifice 134 communicating the inlet chamber 82 with this relief valve. In this case, excess accumulator pressure would be relieved to the reservoir 26 via outlet port 65, conduit 66, 68, and 70, modulator valves 44 and 46 and conduits 52, 54, and 55.

MODE OF OPERATION

During brake application, a controlled fluid pressure is generated by master cylinder 32 and communicated to brakes 14 and 16 via conduits 38, 40, and 42, modulator valves 44 and 46, and conduits 48 and 50. This fluid pressure in the rear wheel brakes 14 and 16 retards the rotation of wheels (not shown) and may create a potential wheel skid condition. The control unit 56 cooperates with wheel sensors 58 and 60 to sense a potential wheel skid condition. In response to such a potential wheel skid condition the control unit 56 causes modulator valves 44 and 46 to close communication between the master cylinder 32 and the brakes 14 and 16 and to open the brakes to the reservoir 29 via conduits 48, 52, 54, and 55. This reduces the fluid pressure in brakes 14 and 16 and decreases the rotation retarding effect of the brakes to eliminate the potential wheel skid condition. When the wheel skid condition is eliminated, even if only momentarily, the control unit 56 causes the modulator valves to close communication between the brakes and the reservoir 29 and to open communication between the accumulator 30 with the brakes via regulator 9 to resume the retardation of the rotation of the wheels (not shown) during the final phase of an anti-skid cycle.

During this final phase of anti-skid operation, the fluid pressure generated by an operator brake application (the brake pressure) is communicated to control chamber 86 through port 63 and moves piston 112 away from member 102 and against the bias of spring 120. This piston movement prevents spring 120 from influencing the position of member 102 or of valve member 94 during an operator brake application. If the brake pressure in control chamber 86 increases, member 104 moves upwardly, viewing FIG. 2, to move spherical portion 96 away from valve seat 92 to thereby increase the communication between inlet chamber 82 and outlet chamber 84. This increased communication between inlet chamber 82 and outlet chamber 84 increases the pressure in outlet chamber 84. Pressure responsive member 102 continues to move upward to increase the pressure in outlet chamber 84 until the pressure in outlet chamber 84 equals the pressure in control chamber 86, wherein a pressure balance between chambers 84 and 86 prevents further movement of pressure responsive member 102.

Should the brake pressure in control chamber 86 decrease, then member 102 will move downward to allow valve member 94 to move toward valve seat 92 to restrict communication between inlet chamber 82 and outlet chamber 84, thus, lowering the pressure in outlet chamber 84. Member 102 will continue this downward movement to lower the pressure in outlet chamber 84 until the pressure in outlet chamber 84 is the same as the pressure in control chamber 86, wherein a new pressure balance is established between chambers 84 and 86 to prevent further movement of pressure responsive member 102. In this manner, the pressure responsive member 102 changes position automatically to adjust the position of valve member 94 to maintain the pressure in outlet chamber 84 the same as the pressure in control chamber 86. Thus, regulator 9 communicates the modulator valves 44 and 46, and thus to brake devices 14 and 16, a pressure equal to the pressure generated by master cylinder 32 and communicated to control chamber 86 during the final phase of anti-skid operation.

A wheel spin condition may occur when a wheel loses traction when torque is applied to it. During anti-spin operation, the control unit 56, through sensor 58 senses the potential wheel spin condition and responds by causing modulator valves 44 and 46 to open communication between the brakes 14 and 16 and the accumulator 30 via conduit 62, chambers 82 and 84, outlet port 65 and conduits 66, 68 and 70 and conduits 48 and 50 and to close communication between the master cylinder 32 and the brakes 14 and 16. This increases the pressure in brakes 14 and 16 to retard the rotation of the wheels to thereby eliminate the potential spin condition, even in the absence of an operator brake application. During this anti-spin operation, the pressure in control chamber 86 is low because no pressure is generated by master cylinder 32. This low pressure in chamber 86 permits piston 112 to move upward under the influence of spring 120, viewing FIG. 2, into engagement with pressure responsive member 102 until pin portion 106 of member 102 engages and moves valve member 94 away from valve seat 92, thereby increasing the communication between inlet chamber 82 and outlet chamber 84. The member 102 continues to move upward under the influence of spring 120 to increase the pressure in outlet chamber 84 until the increased pressure in chamber 84 balances the force of spring 120 upon member 102, wherein further movement of member 102 is prevented. The bias of spring 120 may be chosen so that pressure responsive member 102 and valve member 94 are maintained in a position wherein the pressure in outlet chamber 84 is a predetermined fraction of the accumulator pressure in the inlet chamber 82. During anti-spin operation the pressure in outlet chamber 84 is communicated to brakes 14 and 16 by the modulator valves 44 and 46. Thus, during anti-spin operation, the regulator 9 provides a pressure at a fraction of the pressure in accumulator 30, which pressure may be communicated to the brakes 14 and 16.

I claim:

1. In a brake system which provides anti-skid and anti-spin functions for a wheeled vehicle, the brake system comprising a brake responsive to fluid pressure for retarding the rotation of the wheel, a source of controlled fluid pressure generated during an operator brake application and normally communicated to the brake during the operator brake application, a source of stored fluid pressure, a modulator valve for controlling communication of fluid pressure between the sources and the brake, and control means for sensing a potential wheel skid condition, the control means cooperating with the modulator valve during anti-skid operation to close communication between the controlled pressure source and the brake upon occurrence of the potential skid condition to substantially reduce the fluid pressure communicated to the brake to eliminate the potential skid condition whereupon the control means cooperates with the modulator valve to open communication between the stored pressure source and the brake when the potential skid condition is eliminated, the control means also sensing a potential wheel spin condition and cooperating with the modulator valve during anti-spin operation to open communication between the stored pressure source and the brake to increase the fluid pressure communicated to the brake to eliminate the potential wheel spin condition, the improvement comprising:

a regulator communicated with the stored pressure source, with the controlled pressure source and with the modulator valve, the regulator comprising means for regulating the fluid pressure communicated to the brake when the potential skid condition is eliminated so that the brake fluid pressure is substantially equal to the fluid pressure generated by the controlled source during an operator brake application, the regulator also comprising means for regulating the brake fluid pressure at a predetermined pressure less than the stored fluid pressure during anti-spin operation of the brake system.

2. The brake system of claim 1, wherein the regulator comprises:

a housing defining therewithin an inlet chamber, an outlet chamber and a control chamber;

means for communicating the inlet chamber with the source of stored fluid pressure;

means for communicating the outlet chamber with the modulator valve;

means for communicating the control chamber with the source of controlled fluid pressure;

valve means for controlling communication between the inlet and outlet chambers;

a first member responsive to fluid pressure in the outlet and control chambers and cooperating with the valve means to adjust communication between the inlet and outlet chambers so that the fluid pressure in the outlet chamber is substantially equal to the fluid pressure in the control chamber during generation of the controlled fluid pressure;

a second member responsive to fluid pressure in the control chamber and engageable with the first member; and resilient means biased to urge the second member into engagement with the first member so that the first member cooperates with the valve means to adjust communication between the inlet and outlet chambers so that the fluid pressure in the outlet chamber is a predetermined portion of the fluid pressure in the inlet chamber when the controlled pressure is less than a selected pressure.

3. The regulator of claim 2, wherein:

the housing defines a balancing chamber communicated with the outlet chamber, the housing also defining a valve seat and a passage therethrough for fluid communication between the inlet and outlet chambers; and the valve means comprises a valve member which cooperates with the valve seat to control fluid communication through the passage, the valve member including a first portion exposed to fluid pressure in the balancing chamber, a second portion exposed to fluid pressure in the outlet chamber and a third portion extending through the inlet chamber and connecting the first and second portions, the valve member being thereby exposed to the fluid pressure in the inlet, outlet and balancing chambers to prevent a fluid pressure lock from holding the valve member in a closed position preventing fluid communication through the passage.

4. The regulator of claim 2, further comprising:

a relief valve responsive to fluid pressure in the inlet chamber for communicating the inlet chamber with a fluid reservoir when the fluid pressure in the inlet chamber exceeds a predetermined level.

5. The regulator of claim 2, wherein:

the second member disengages from the first member when the fluid pressure in the control chamber is greater than a chosen pressure to disconnect the resilient means from the first member and the valve means during an operator brake application.

6. A regulator for regulating a fluid pressure communicated to a fluid pressure responsive device, the regulator comprising:

a housing defining therewithin an inlet chamber communicated with a source of stored fluid pressure, an outlet chamber communicated with the pressure responsive device, and a control chamber communicated with a source of controlled fluid pressure;

valve means for controlling communication between the inlet and outlet chambers;

a first member responsive to fluid pressure in the outlet and control chambers and cooperating with the valve means to adjust communication between the inlet and outlet chambers so that the fluid pressure in the outlet chamber is substantially equal to the fluid pressure in the control chamber during generation of the controlled fluid pressure;

a second member responsive to fluid pressure in the control chamber and engageable with the first pressure responsive member;

resilient means biased to urge the second member into engagement with the first member so that the first member cooperates with the valve member to adjust communication between the inlet and outlet chambers so that the fluid pressure in the outlet chamber is a predetermined portion of the fluid pressure in the inlet chamber when the controlled pressure is less than a selected pressure;

the housing defines a balancing chamber communicated with the outlet chamber, the housing also defining a valve seat and a passage therethrough for fluid communication between the inlet and outlet chambers; and the valve means comprises a valve member which cooperates with the valve seat to control fluid communication through the passage, the valve member including a first portion exposed to fluid pressure in the balancing chamber, a second portion exposed to fluid pressure in the outlet chamber and a third portion extending through the inlet chamber and connecting the first and second portions, the valve member being thereby exposed to the fluid pressure in the inlet, outlet and balancing chambers to prevent a fluid pressure lock from holding the valve member in a closed position preventing fluid communication through the passage.

* * * * *